(12) United States Patent
Shibukawa

(10) Patent No.: US 7,750,527 B2
(45) Date of Patent: Jul. 6, 2010

(54) MOTOR/GENERATOR

(75) Inventor: Yuichi Shibukawa, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 545 days.

(21) Appl. No.: 11/684,780

(22) Filed: Mar. 12, 2007

(65) Prior Publication Data

US 2007/0216252 A1 Sep. 20, 2007

(30) Foreign Application Priority Data

Mar. 16, 2006 (JP) ............................. 2006-072558

(51) Int. Cl.
*H02K 16/02* (2006.01)
(52) U.S. Cl. ..................... 310/191; 310/113; 310/114
(58) Field of Classification Search .............. 310/190, 310/191, 209, 113, 114, 156.37
See application file for complete search history.

(56) References Cited

U.S. PATENT DOCUMENTS 5,907,199 A * 5/1999 Miller ................. 310/12.14
6,049,152 A 4/2000 Nakano

FOREIGN PATENT DOCUMENTS

JP 05-75551 10/1993
JP 2002-247822 8/2002

* cited by examiner

*Primary Examiner*—Quyen Leung
*Assistant Examiner*—Eric Johnson
(74) *Attorney, Agent, or Firm*—Global IP Counselors, LLP

(57) ABSTRACT

A motor/generator is basically provided with a stator, a first rotor member and a magnetic resistance changing mechanism. The stator has a plurality of coils configured and arranged to be energized with a composite electrical current to form first and second magnetic fields. The first rotor member is configured and arranged to be rotated with respect to the stator using the first magnetic field. The magnetic resistance changing mechanism is configured and arranged to change a magnetic resistance between the stator and the first rotor member using the second magnetic field.

13 Claims, 5 Drawing Sheets

FLOW OF MAGNETIC FLUX FLOWING IN DIRECTION FROM PLANE OF PAPER TO FRONT SIDE OF PLANE OF PAPER

FLOW OF MAGNETIC FLUX FLOWING IN DIRECTION FROM FRONT SIDE OF PLANE OF PAPER TO PLANE OF PAPER

MOTOR/GENERATOR

CROSS-REFERENCE TO RELATED APPLICATIONS

This application claims priority to Japanese Patent Application No. 2006-072558, filed on Mar. 16, 2006. The entire disclosure of Japanese Patent Application No. 2006-072558 is hereby incorporated herein by reference.

BACKGROUND OF THE INVENTION

1. Field of the Invention

The present invention relates to a motor/generator configured and arranged to change a magnetic resistance between a stator and a rotor thereof.

2. Background Information

Japanese Laid-Open Patent Publication No. 2002-247822 discloses a conventional a motor/generator having a plurality of permanent magnets provided in a rotor thereof. In such conventional motor/generator, the induced voltage tends to become high when the motor/generator rotates at high speeds. Thus, in the conventional motor/generator disclosed in the above mentioned reference is configured and arranged to prevent the induced voltage from becoming high by increasing the magnetic resistance between a stator and the rotor when the rotor rotates at high speeds.

More specifically, the conventional motor/generator disclosed in the above mentioned reference includes the rotor, the stator having a plurality of coils, a magnetic resistance changing mechanism and an actuator. The conventional motor/generator is configured and arranged to generate a magnetic field when the coils of the stator are energized with an electric current such that the rotor is driven by using the magnetic field. The magnetic resistance changing mechanism is configured and arranged to change the magnetic resistance between the stator and the rotor by changing the size of a gap existing between the stator and the rotor. The actuator is configured and arranged to actuate the magnetic resistance changing mechanism in accordance with an operating state of the motor/generator.

In view of the above, it will be apparent to those skilled in the art from this disclosure that there exists a need for an improved motor/generator. This invention addresses this need in the art as well as other needs, which will become apparent to those skilled in the art from this disclosure.

SUMMARY OF THE INVENTION

The conventional motor/generator disclosed in the above mentioned reference requires a separate actuator to be provided in order to change the magnetic resistance between the stator and the rotor. As a result, the number of parts increases, and the cost of manufacturing the motor/generator becomes higher.

Accordingly, one object of the present invention is to provide a motor/generator that is configured and arranged to change a magnetic resistance between a stator and a rotor without providing a separate actuator.

In order to achieve the above object of the present invention, a motor/generator is basically provided that comprises a stator, a first rotor member and a magnetic resistance changing mechanism. The stator has a plurality of coils configured and arranged to be energized with a composite electrical current to form first and second magnetic fields. The first rotor member is configured and arranged to be rotated with respect to the stator using the first magnetic field. The magnetic resistance changing mechanism is configured and arranged to change a magnetic resistance between the stator and the first rotor member using the second magnetic field.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
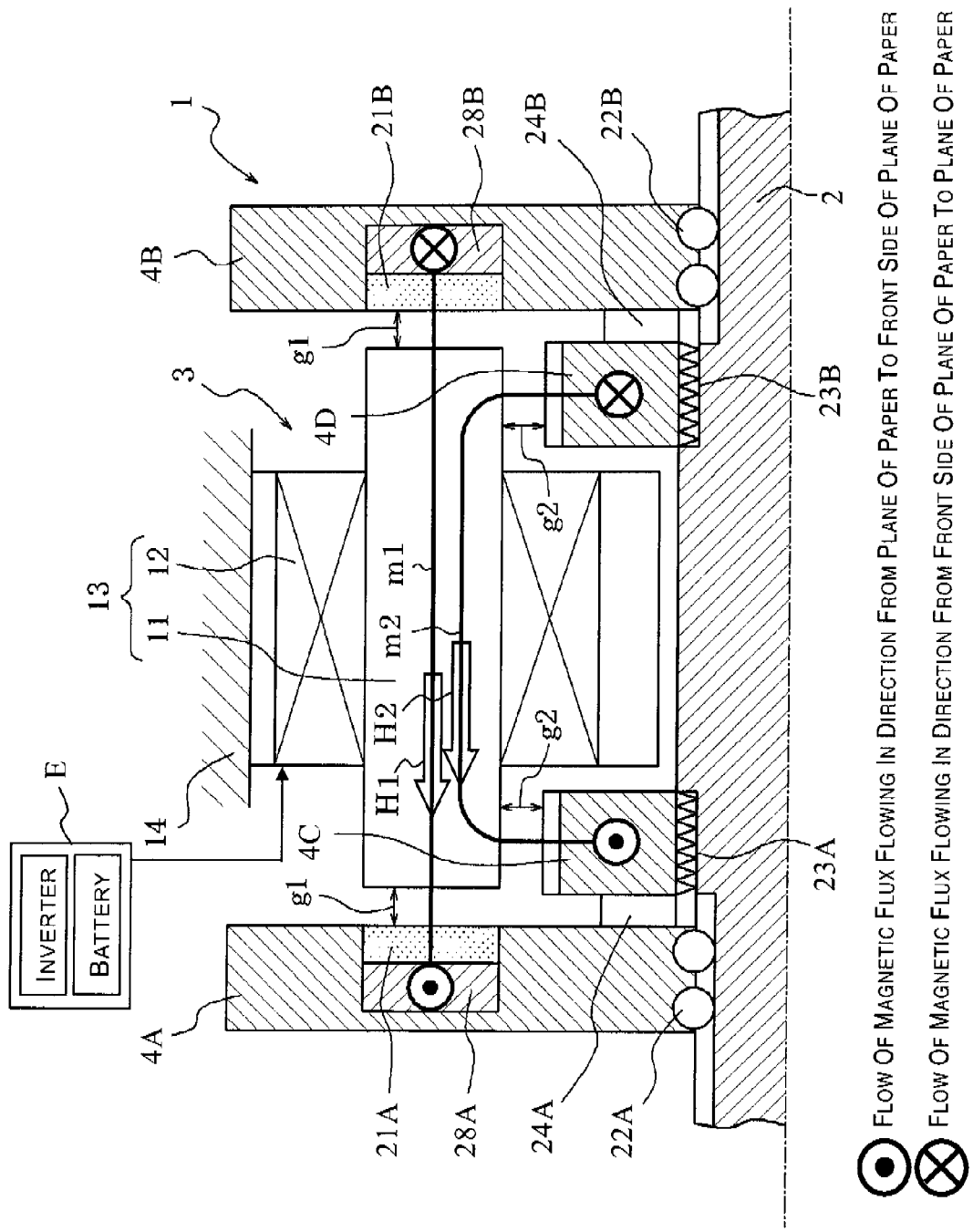
FIG. 1 is a simplified cross sectional view of a motor/generator taken along a center axis of a rotary shaft of the motor/generator in accordance with a first embodiment of the present invention.

Referring initially to FIG. 1, a motor/generator 1 is illustrated in accordance with a first embodiment of the present invention. FIG. 1 is a simplified cross sectional view of the motor/generator 1 as taken along a center axis of a rotary shaft 2 of the motor/generator 1. In the first embodiment illustrated in FIG. 1, the present invention is applied to the motor/generator 1 that is arranged as an axial gap motor/generator. More specifically, the motor/generator 1 includes a stator 3 and a pair of first and second drive rotors 4A and 4B (first rotor member) arranged to face the stator 3 with axial gaps g1 being formed therebetween. Moreover, as shown in FIG. 1, the motor/generator 1 further includes a pair of first and second auxiliary rotors 4C and 4D (second rotor member) and a pair of screw sections 23A and 23B (power converting mechanism).

The stator 3 includes a plurality of stator units 13 that are arranged circumferentially with respect to the rotary shaft 2 and supported in a case member 14. Each of the stator units 13 includes a stator core 11 and a coil 12 wound around the stator core 11 as shown in FIG. 1.

The first and second drive rotors 4A and 4B are circular disk-shaped members arranged on both axially facing sides of the stator 3. As shown in FIG. 1, the first drive rotor 4A has a permanent magnet 21A and a back yoke 28A, and the second drive rotor 4B has a permanent magnet 21B and a back yoke 28B. The first and second drive rotors 4A and 4B are preferably mounted to the rotary shaft 2 on a pair of first and second ball splines 22A and 22B such that the first and second drive rotors 4A and 4B can move axially relative to the rotary shaft 2 but cannot rotate relative to the rotary shaft 2.

The first and second auxiliary rotors 4C and 4D are arranged radially inwardly of the stator 3 to face the stator 3 across radial gaps g2 (i.e., with the radial gaps g2 being formed between the stator 3 and the first and second auxiliary rotors 4C and 4D).

Each of the first and second auxiliary rotors 4C and 4D has a plurality of protrusions and a plurality of recessions arranged alternately along a circumferential direction on an outer peripheral portion thereof. The protrusions serve as protruding poles and constitute a plurality of magnetic poles. Alternatively, the first and second auxiliary rotors 4C and 4D can be provided with a plurality of permanent magnets instead of having the structure with the protrusions and the recessions.

As shown in FIG. 1, a first thrust bearing 24A is provided between the first auxiliary rotor 4C and the first drive rotor 4A, and a second thrust bearing 24B is provided between the second auxiliary rotor 4C and the second drive rotor 4B. Thus, the first and second drive rotors 4A and 4B thrust against the first and second auxiliary rotors 4C and 4D via the first and second thrust bearings 24A and 24B, respectively.

The first and second auxiliary rotors 4C and 4D are mounted to the rotary shaft 2 by the screw sections 23A and 23B, respectively. The screw sections 23A and 23B include female screws formed on inner circumferential surfaces of the first and second auxiliary rotors 4C and 4D that face the rotary shaft 2, and male screws formed on outer circumferential surfaces of the rotary shaft 2. In the first embodiment illustrated in FIG. 1, the first and second auxiliary rotors 4C and 4D and the screw sections 23A and 23B correspond to a magnetic resistance changing mechanism of the present invention.

In the axial gap type motor/generator 1 as illustrated in FIG. 1, the coils 12 of the stator 3 are connected to an electric circuit E provided with an inverter and a battery, and the electric circuit E is configured to supply a composite electrical current to the coils 12. The composite electrical current includes a first current component configured to drive the first and second drive rotors 4A and 4B and a second current component configured to drive the first and second auxiliary rotors 4C and 4D. The composite electric current that can be used to drive the first and second drive rotors 4A and 4B and the first and second auxiliary rotors 4C and 4D in the present invention as described above is disclosed in U.S. Pat. No. 6,049,152 assigned to the assignee of the present application. The entire disclosure of U.S. Pat. No. 6,049,152 is hereby incorporated herein by reference.

The coils 12 are configured and arranged to generate a first magnetic field H1 when energized with the first current component of the composite electric current and a second magnetic field H2 when energized with the second current component of the composite electric current as shown in FIG. 1. The first magnetic field H1 causes a first magnetic circuit m1 to form between the stator 3 and the first and second drive rotors 4A and 4B. The second magnetic field H2 causes a second magnetic circuit m2 to form between the stator 3 and the first and second auxiliary rotors 4C and 4D.

The first magnetic circuit m1 is configured such that the magnetic flux flows as follows: the stator core 11 (in plane of paper in FIG. 1)→the permanent magnet 21A (in plane of paper in FIG. 1)→the back yoke 28A→the permanent magnet 21A (above or in front of plane of paper in FIG. 1, not shown)→the stator core 11 (above or in front of plane of paper in FIG. 1, not shown)→the permanent magnet 21B (above or in front of plane of paper in FIG. 1, not shown)→the back yoke 28B→the permanent magnet 21B (in plane of paper in FIG. 1)→the stator core 11 (in plane of paper in FIG. 1).

The second magnetic circuit m2 is configured such that the magnetic flux flows as follows: the stator core 11 (in plane of paper in FIG. 1)→one of the protruding poles of the first auxiliary rotor 4C (below or behind plane of paper in FIG. 1)→another one of the protruding poles of the first auxiliary rotor 4C (above or in front of plane of paper in FIG. 1, not shown)→the stator core 11 (above or in front of plane of paper in FIG. 1, not shown)→one of the protruding poles of the second auxiliary rotor 4D (above or in front of plane of paper in FIG. 1, not shown)→another one of the protruding poles of the second auxiliary rotor 4D (below or behind plane of paper in FIG. 1)→the stator core 11 (in plane of paper in FIG. 1).

The operation of the first embodiment will now be explained. When the coils 12 are energized with the first current component of the composite electrical current, the stator 3 is configured and arranged to generate the first magnetic field H1 that drives the first and second drive rotors 4A and 4B. Therefore, the rotary shaft 2 is rotated along with the rotation of the first and second drive rotors 4A and 4B.

On the other hand, when the coils 12 are energized with the second current component of the composite electrical current, the stator 3 is configured and arranged to generate the second magnetic field H2 that drives the first and second auxiliary rotors 4C and 4D such that the first and second auxiliary rotors 4C and 4D rotate relative to the rotary shaft 2. When the relative rotation between the rotary shaft 2 and the first and second auxiliary rotors 4C and 4D occurs, the screw action of the screw sections 23A and 23B causes the first auxiliary rotor 4C to move toward the first drive rotor 4A and the second auxiliary rotor 4C to move toward the second drive rotor 4B. More specifically, when the first and second auxiliary rotors 4C and 4D are rotated relative to the rotary shaft 2, the first and second drive rotors 4A and 4B are moved axially away from the stator 3 due to the axial movements of the first and second auxiliary rotors 4C and 4D. Thus, the screw sections 23A and 23B are configured and arranged to convert the rotary torque of the first and second auxiliary rotors 4C and 4D into an axial force that moves the first and second drive rotors 4A and 4B in the axial direction. As a result, the lengths of the axial gaps g1 between the stator 3 and the first and second drive rotors 4A and 4B increase, and thus, the magnetic resistance between the stator 3 and the first and second drive rotors 4A and 4B increases.

Accordingly, with the first embodiment of the present invention, the first and second drive rotors 4A and 4B (that drive the rotary shaft 2) and the first and second auxiliary rotors 4C and 4D (that form the magnetic resistance changing mechanism) can both be selectively driven by supplying the composite electrical current to the single stator 3. As a result, it is not necessary to provide a separate actuator to change the magnetic resistance between the stator 3 and the first and second drive rotors 4A and 4B.

Moreover, in the first embodiment, when the rotational speed of the first and second drive rotors 4A and 4B is high and only a weak magnetic field is required, the composite electric current can be used to move the first and second drive rotors 4A and 4B axially outward and increase the lengths of the axial gaps g1. Increasing the lengths of the axial gaps g1 increases the magnetic resistance and decreases the magnetic flux between the stator 3 and the first and second drive rotors 4A and 4B. Therefore, the increase in the induced voltage due to the high rotational speed of the first and second drive rotors 4A and 4B can be suppressed. On the other hand, when the rotational speed of the first and second drive rotors 4A and 413 is low and a weak magnetic field is not required, the composite electric current can be controlled to move the first and second drive rotors 4A and 4B axially inward to decrease the lengths of the axial gaps g1.

Accordingly, the motor/generator 1 in accordance with the present invention is configured and arranged to drive the first and second drive rotors 4A and 4B and to change the magnetic resistance between the stator 3 and the first and second drive rotors 4A and 4B by energizing the coils 12 of the stator 3 with the composite electrical current. As a result, it is not necessary to provide a separate actuator and the number of parts and cost of manufacturing the motor/generator 1 can be prevented from increasing.

Second Embodiment

Figure 2:
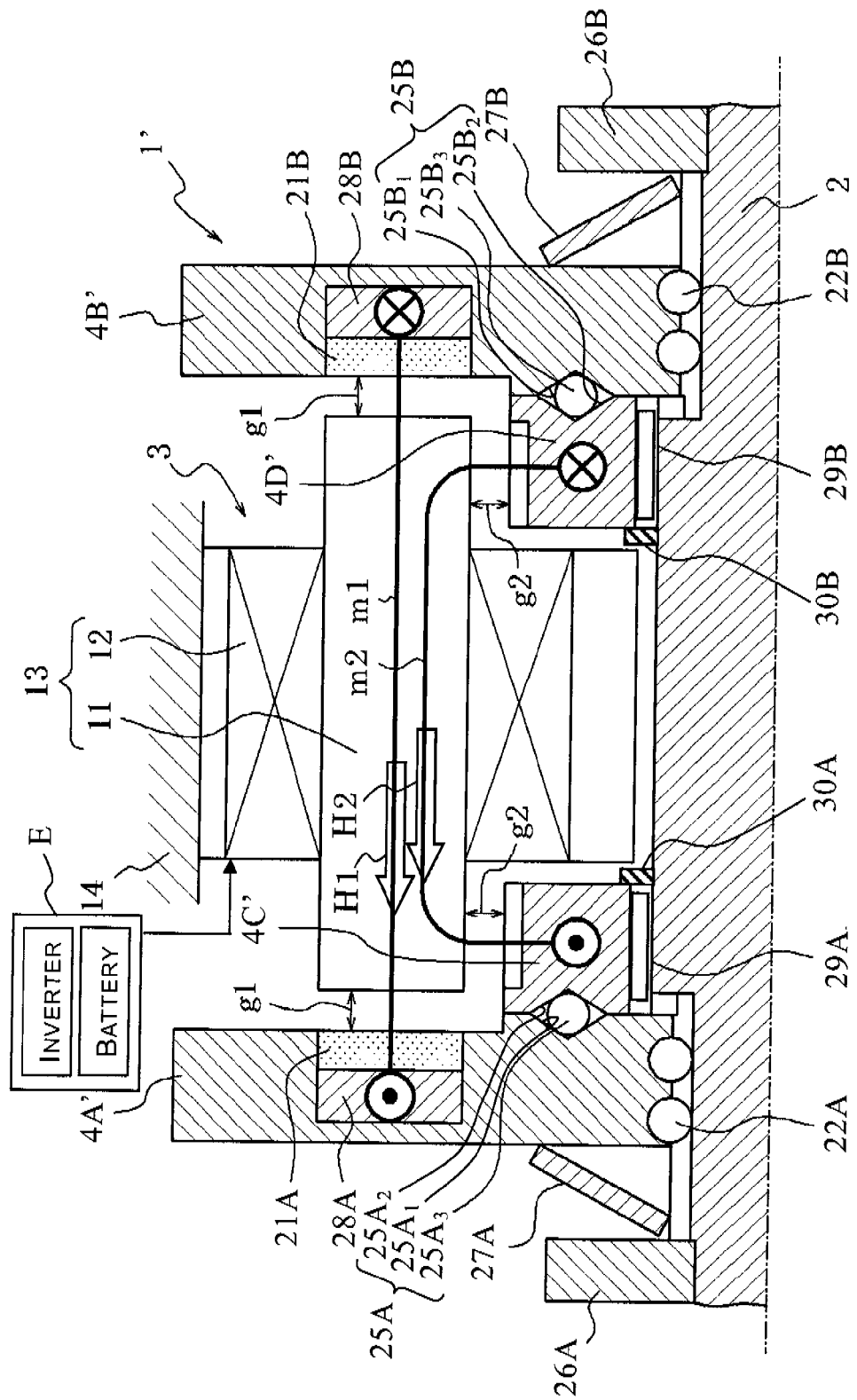
FIG. 2 is a simplified cross sectional view of a motor/generator taken along a center axis of a rotary shaft of the motor/generator in accordance with a second embodiment of the present invention.

Referring now to FIG. 2, a motor/generator 1' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The motor/generator 1' of the second embodiment differs from the motor/generator 1 of the first embodiment in a mechanism for moving a pair of first and second drive rotors 4A' and 4B' (first rotor member) in the axial direction. More specifically, the motor/generator 1' of the second embodiment is provided with a pair of loading cam mechanisms 25A and 25B as the power converting mechanism instead of the screw sections 23A and 23B used in the first embodiment as shown in FIG. 1. The motor/generator 1' of the second embodiment also includes a pair of first and second auxiliary rotors 4C' and 4D' (second rotor member).

As shown in FIG. 2, the loading cam mechanism 25A is provided between the first auxiliary rotor 4C' and the first drive rotor 4A', and the loading cam mechanism 25B is provided between the second auxiliary rotor 4D' and the second drive rotor 4B'. The loading cam mechanisms 25A and 25B preferably have a conventional structure, such as the structure disclosed in, for example, Japanese Laid-Open Utility Model Patent Application Publication No. 05-075551. The entire disclosure of Japanese Laid-Open Utility Model Patent Application Publication No. 05-075551 is hereby incorporated herein by reference.

As shown in FIG. 2, the loading cam mechanism 25A includes a cam surface $25A_1$ formed on an axial inner surface of the first drive rotor 4A', a cam surface $25A_2$ formed on an axial outer surface of the first auxiliary rotor 4C', and a rolling body $25A_3$ arranged between the cam surfaces $25A_1$ and $25A_2$. Similarly, the loading cam mechanism 25B includes a cam surface $25B_2$ formed on an axial outer surface of the second auxiliary rotor 4C', a cam surface $25B_1$ formed on an axial inner surface of the second drive rotor 4B', and a rolling body 25B3 arranged between the cam surfaces $25B_1$ and $25B_2$. The loading cam mechanism 25A is configured and arranged such that an axial force is generated when an angular phase difference occurs between the first drive rotor 4A' and the first auxiliary rotor 4C'. The loading cam mechanism 25B is configured and arranged such that an axial force is generated when an angular phase difference occurs between the second auxiliary rotor 4C' and the second drive rotor 4B'. Thus, in the second embodiment illustrated in FIG. 2, the first and second auxiliary rotors 4C' and 4D' and the loading cam mechanisms 25A and 25B correspond to a magnetic resistance changing mechanism of the present invention.

The first and second auxiliary rotors 4C' and 4D' are rotatably supported on the rotary shaft 2 with a pair of bearings 29A and 2913, respectively. Moreover, as shown in FIG. 2, the motor/generator 1' includes a pair of stoppers 30A and 30B to restrict axial movements of the first and second auxiliary rotors 4C' and 4B' toward the stator 3.

Also, the motor/generator 1' further includes a pair of Belleville springs 27A and 27B and a pair of stoppers 26A and 26B. The Belleville springs 27A and 27B are configured and arranged to spring load the first and second drive rotors 4A' and 4B' toward the stator 3. The stoppers 26A and 26B are configured and arranged to position the Belleville springs 27A and 27B.

With the motor/generator 1' of the second embodiment, when the coils 12 are energized with the first current component of the composite electrical current, the stator 3 is configured and arranged to generate the first magnetic field H1 that rotatably drives the first and second drive rotors 4A' and 4B'. Therefore, the rotary shaft 2 is rotated along with the rotation of the first and second drive rotors 4A' and 4B'.

On the other hand, when the coils 12 are energized with the second current component of the composite electrical current, the stator 3 is configured and arranged to generate the second magnetic field H2 that drives the first and second auxiliary rotors 4C' and 4D'. By changing (differentiating) the drive forces acting on the first and second auxiliary rotors 4C' and 4D' from the drive forces acting on the first and second drive rotors 4A' and 4B' using the first and second current components of the composite electrical current, an angular phase difference can be produced between the first auxiliary rotor 4C' and the first drive rotor 4A' and between the second auxiliary rotor 4D' and the second drive rotor 4B'. The angular phase difference causes the loading cam mechanisms 25A and 25B to operate and move the first and second drive rotors 4A' and 4B' farther away from the stator 3 along the axial direction of the rotary shaft 2. As a result, the lengths of the axial gaps g1 between the first and second drive rotors 4A' and 4B' and the stator 3 increase. Therefore, the magnetic resistance between the stator 3 and the first and second drive rotors 4A' and 4B' increases.

Accordingly, the motor/generator 1' of the second embodiment can achieve the same effects as in the motor/generator 1 of the first embodiment as explained above. In addition, the force produced by the second current component of the composite electrical current for increasing the lengths of the axial gaps g1 is transmitted from the first and second auxiliary rotors 4C' and 4D' to the rotary shaft 2 through the loading cam mechanisms 25A and 25B and the first and second drive rotors 4A' and 4B'. Therefore, the force produced by the second current component also serves as a force that drives the rotary shaft 2. Thus, the second current component supplied in order to increase the magnetic resistance can be used effectively as a drive force in the second embodiment of the present invention.

Third Embodiment

Figure 3:
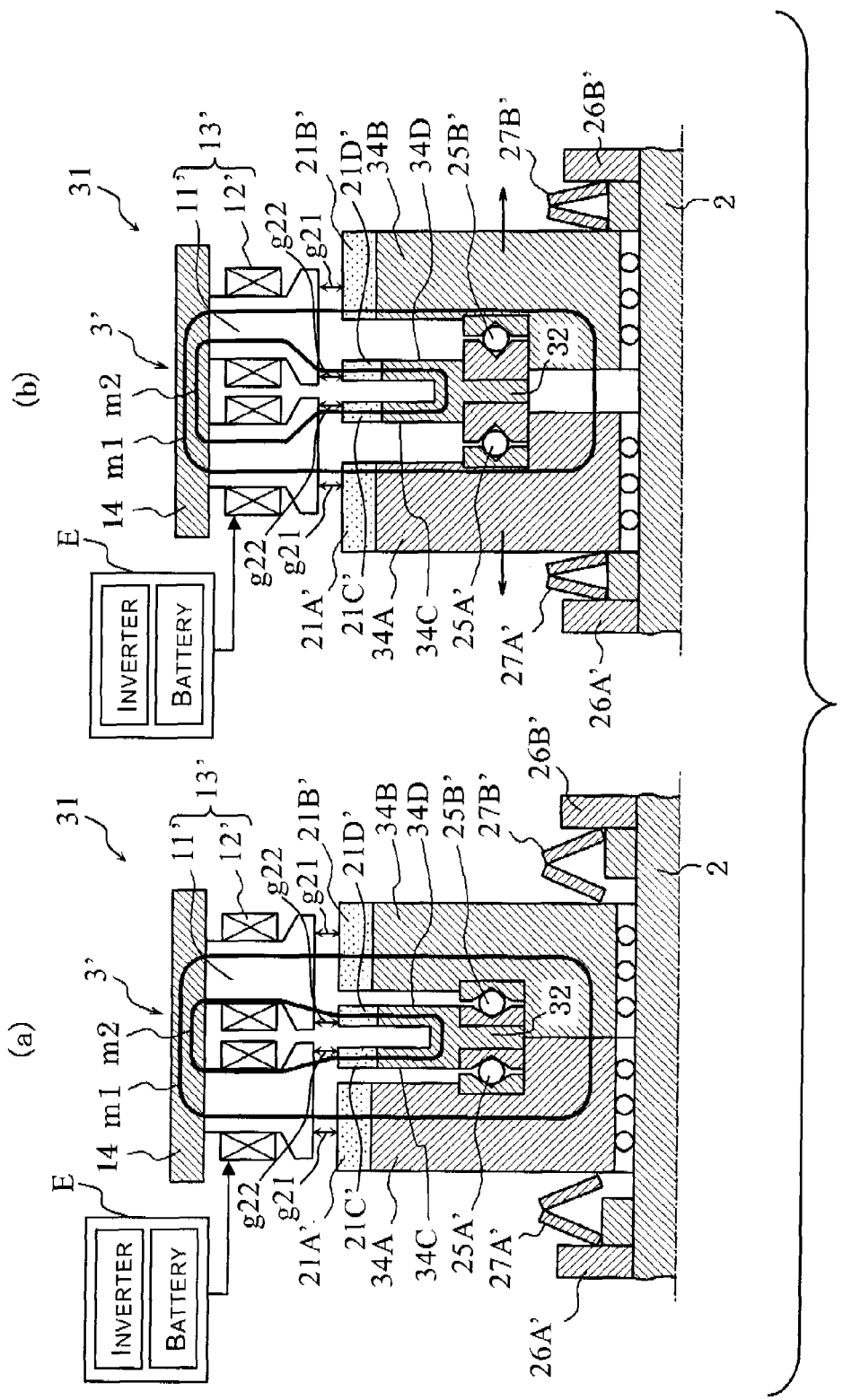
FIG. 3 is a pair of diagrams (a) and (b) illustrating simplified cross sectional views of a motor/generator taken along a center axis of a rotary shaft of the motor/generator in accordance with a third embodiment of the present invention, wherein the diagram (a) illustrates a low rotations speed state and the diagram (b) illustrates a high rotational speed state.

Referring now to FIG. 3, a motor/generator 31 in accordance with a third embodiment will now be explained. In view of the similarity between the first, second and third embodiments, the parts of the third embodiment that are identical to the parts of the first or second embodiment will be given the same reference numerals as the parts of the first or second embodiment. Moreover, the descriptions of the parts of the third embodiment that are identical to the parts of the first or second embodiment may be omitted for the sake of brevity. The parts of the third embodiment that differ from the parts of the first or second embodiment will be indicated with a single prime (').

FIG. 3 is a pair of diagrams (a) and (b) illustrating simplified cross sectional views of the motor/generator 31 taken along a center axis of the rotary shaft 2 of the motor/generator 31 in accordance with the third embodiment of the present invention. The diagram (a) of FIG. 3 illustrates a low rotations speed state of the motor/generator 31 and the diagram (b) of FIG. 3 illustrates a high rotational speed state of the motor/generator 31. In the third embodiment, the motor/generator 31 is arranged as a radial gap type motor/generator in which a stator 3' and a pair of first and second drive rotors 34A and 34B are arranged to face each other across radial gaps g21 as shown in the diagrams (a) and (b) of FIG. 3. In other words, the stator 3' and the first and second drive rotors 34A and 34B are positioned such that the first and second drive rotors 34A and 34B and the stator 3' at least partially overlap as viewed in a radial direction with respect to the rotary shaft 2. The first and second drive rotors 34A and 34B include permanent magnets 21A' and 21B', respectively, which are disposed on circumferential surfaces of the first and second drive rotors 34A and 34B.

More specifically, the motor/generator 31 includes the stator 3', the first and second drive rotors 34A and 34B (first rotor member), a pair of first and second auxiliary rotors 34C and 34D (second rotor member) and a pair of loading cam mechanisms 25A' and 25B' (power converting mechanism). The structures of the loading cam mechanisms 25A' and 25B' are preferably the same as the structures of the loading cam mechanisms 25A and 25B of the second embodiment illustrated in FIG. 2.

In the third embodiment, the first and second auxiliary rotors 34C and 34D are also arranged to face the stator 3, across radial gaps g22 as shown in the diagrams (a) and (b) of FIG. 3. Moreover, the first and second auxiliary rotors 34C and 34D are formed as an integral part of at a base part 32 of the first and second auxiliary rotors 34C and 34D, which is located closer (radially inwardly) to the rotary shaft 2. Furthermore, in the third embodiment, the first and second auxiliary rotors 34C and 34D preferably include a plurality of permanent magnets 21C' and 21D', respectively, that are disposed on the circumferential surfaces of the first and second auxiliary rotors 34C and 34D as shown in the diagrams (a) and (b) of FIG. 3. Alternatively, the first and second auxiliary rotors 34C and 34D can be provided with a plurality of protrusions and a plurality of recessions that are alternately arranged on the circumferential surfaces of the first and second auxiliary rotors 34C and 34D similarly to the first and second auxiliary rotors 4C and 4D of the first embodiment described above.

The loading cam mechanism 25A' is provided between the base part 32 (of the first and second auxiliary rotors 34C and 34D) and the first drive rotor 34A. The loading cam mechanism 25B' is provided between the base part 32 and the second drive rotor 34B. Alternatively, it is also acceptable to provide a single loading cam mechanism 25A' or 25B' on only one axial side of the base part 32.

The stator 3' includes a plurality of stator units 13' that are arranged circumferentially with respect to the rotary shaft 2 and supported in the case member 14. Each of the stator units 13B includes a stator core 11' and a coil 12' wound around the stator core 11' as shown in the diagrams (a) and (b) of FIG. 3.

With the motor/generator 31 of the third embodiment, when the coils 12' are energized with the first current component of the composite electrical current, the stator 3' is configured and arranged to generate a first magnetic field causing a first magnetic circuit m1 that drives the first and second drive rotors 34A and 34B. Therefore, the rotary shaft 2 is rotated along with the rotation of the first and second drive rotors 34A and 34B.

On the other hand, when the coils 12' are energized with the second current component of the composite electrical current, the stator 3' is configured and arranged to generate a second magnetic field causing a second magnetic circuit m2 that drives the first and second auxiliary rotors 34C and 34D. By changing (differentiating) the drive forces acting on the first and second auxiliary rotors 34C and 34D from the drive forces acting on the first and second drive rotors 34A and 34B, an angular phase difference can be produced between the first auxiliary rotor 34C and the first drive rotor 34A and between the second auxiliary rotor 34D and the second drive rotor 34B. The angular phase difference causes the loading cam mechanisms 25A' and 25B' to operate and move the first and second drive rotors 34A and 34B farther away from the stator 3' along the axial direction of the rotary shaft 2. When the first and second drive rotors 34A and 34B move away from the stator 3' in the axial direction, a circumferential area (surface area) of the first and second drive rotors 34A and 34B that overlap the stator 3' (the stator units 13') as viewed in the radial direction decreases. Accordingly, the magnetic resistance between the stator 3' and the first and second drive rotors 34A and 34B increases. Thus, in the third embodiment illustrated in FIG. 3, the first and second auxiliary rotors 34C and 34D and the loading cam mechanisms 25A' and 25B' correspond to a magnetic resistance changing mechanism of the present invention.

Referring to the diagrams (a) and (b) of FIG. 3, the operation of the third embodiment will now be explained in more detail. The diagram (a) of FIG. 3 shows the state of the motor/generator 31 when the rotational speed is low. In such case, the composite electrical current supplied to the coils 12' from the electric circuit E is set such that the first and second drive rotors 34A and 34B and the first and second auxiliary rotors 34C and 34D are rotated with the same drive force to maintain the positional relationship therebetween as shown in the diagram (a) of FIG. 3. Consequently, the axial cross sectional area of the space where the radial gaps g21 exist between the stator 3' and the first and second drive rotors 34A and 34B is maximized. In other words, the circumferential area of the first and second drive rotors 34A and 34B that overlap the stator units 13' as viewed in the radial direction is maximized.

On the other hand, the diagram (b) of FIG. 3 shows the state of the motor/generator 31 when the rotational speed is high. In such case, the composite electrical current supplied to the coils 12' from the electric circuit E is controlled such that the drive force acting on the first and second drive rotors 34A and 34B is different from the drive forces acting on the first and second auxiliary rotors 34C and 34D, and thus, an angular phase difference develops between the first and second auxiliary rotors 34C and 34D and the first and second drive rotors 34A and 34B. As a result, the loading cam mechanisms 25A' and 25B' are configured and arranged to operate to move the first and second drive rotors 34A and 34B farther away from the stator 3' in the axial direction. Consequently, the axial cross sectional area of the space where the radial gaps g21 exist between the stator 3' and the first and second drive rotors 34A and 34B is reduced. In other words, the circumferential area of the first and second drive rotors 34A and 34B that overlap the stator units 13' as viewed in the radial direction is reduced. The reduction of the axial cross sectional area of the spaces where the axial gaps g21 exist causes the magnetic resistance between the stator 3' and the first and second drive rotors 34A and 34B to increase.

Accordingly, the motor/generator 31 of the third embodiment shown in the diagrams (a) and (b) of FIG. 3 can achieve the same operational effects as the first and second embodiments shown in FIGS. 1 and 2.

Fourth Embodiment

Figure 4:
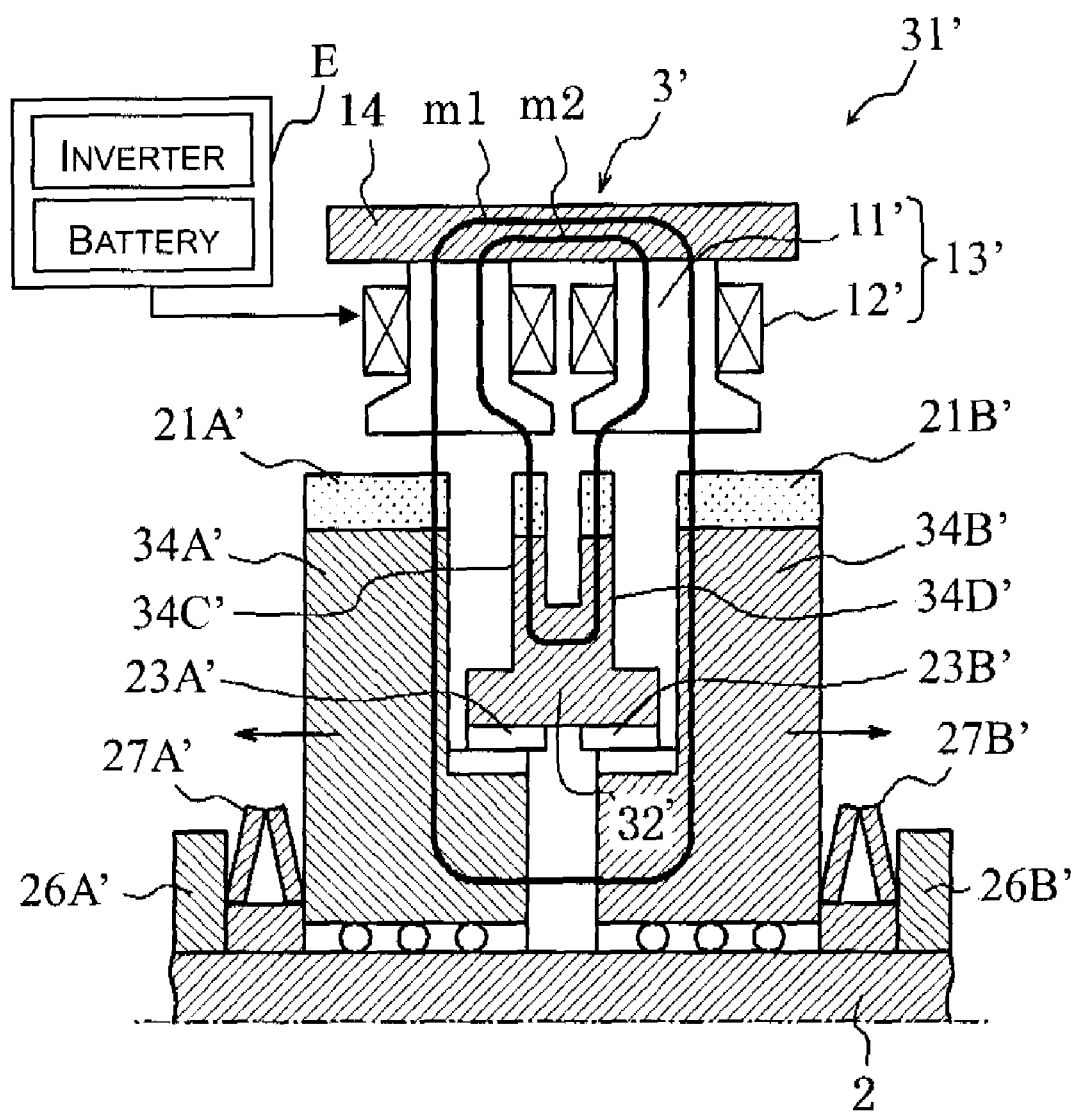
FIG. 4 is a simplified cross sectional view of a motor/generator taken along a center axis of a rotary shaft of the motor/generator in accordance with a fourth embodiment of the present invention.

Referring now to FIG. 4, a motor/generator 31' in accordance with a fourth embodiment will now be explained. In view of the similarity between the first, third and fourth embodiments, the parts of the fourth embodiment that are identical to the parts of the first or third embodiment will be given the same reference numerals as the parts of the first or third embodiment. Moreover, the descriptions of the parts of the fourth embodiment that are identical to the parts of the first or third embodiment may be omitted for the sake of brevity. The parts of the fourth embodiment that differ from the parts of the first or third embodiment will be indicated with a single prime (').

The motor/generator 31' of the fourth embodiment differs from the motor/generator 31 of the third embodiment in a mechanism for moving first and second drive rotors 34A' and 34B' (first rotor member) in the axial direction. More specifically, the motor/generator 31' of the fourth embodiment includes a pair of screw sections 23A' and 23B' (power converting mechanism) between a base part 32' of a pair of first and second auxiliary drive rotors 34C' and 34D' (second rotor member) and the first and second drive rotors 34A' and 34B' instead of the loading cam mechanisms 25A' and 25B' used in the third embodiment shown in FIG. 3. The structures of the screw sections 23A' and 23B' are preferably similar to the structures of the screw sections 23A and 23B of the motor/generator 1 of the first embodiment (FIG. 1) described above.

In the fourth embodiment, the screw sections 23A' and 23B' are configured and arranged to move the first and second drive rotors 34A' and 34B' in the axial direction with respect to the first and second auxiliary rotors 34C' and 34D' by driving the first and second auxiliary rotors 34C' and 34D' (the base part 32') with the second current component of the composite electrical current. More specifically, the first current component of the composite electrical current forms the first magnetic circuit m1 with the first magnetic field for driving the first and second drive rotors 34A' and 34B', and the second current component of the composite electrical current forms the second magnetic circuit m2 with the second magnetic field for driving the first and second auxiliary rotors 34C' and 34D'. Thus, in the fourth embodiment illustrated in FIG. 4, the first and second auxiliary rotors 34C' and 34D' and the screw sections 23A' and 23B' correspond to a magnetic resistance changing mechanism of the present invention.

Accordingly, the motor/generator 31' of the fourth embodiment shown in FIG. 4 can achieve the same operational effects as the first through third embodiments shown in FIGS. 1 through 3.

Fifth Embodiment

Figure 5:
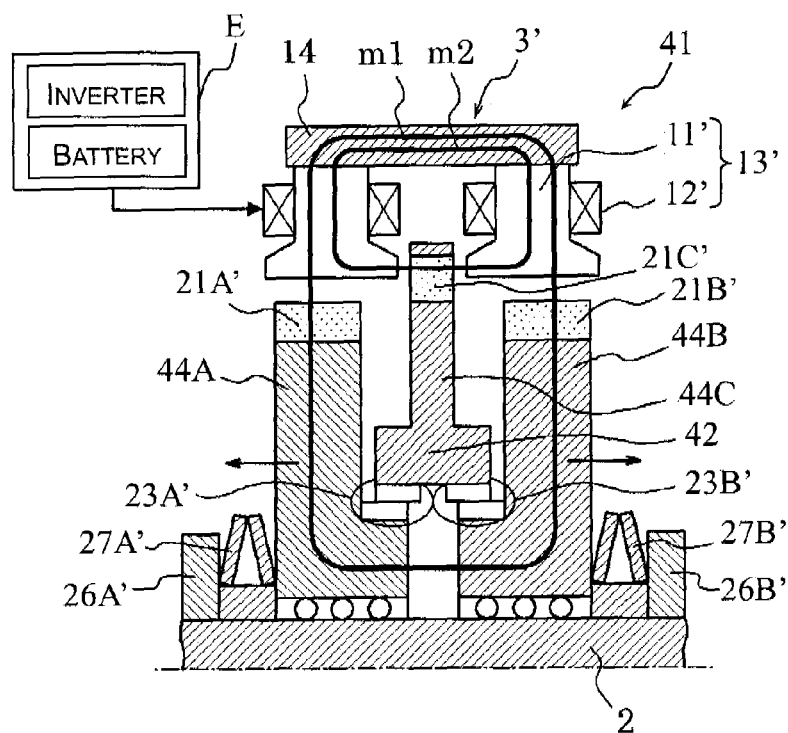
FIG. 5 is a simplified cross sectional view of a motor/generator taken along a center axis of a rotary shaft of the motor/generator in accordance with a fifth embodiment of the present invention.

Referring now to FIG. 5, a motor/generator 41 in accordance with a fifth embodiment will now be explained. In view of the similarity between the fourth and fifth embodiments, the parts of the fifth embodiment that are identical to the parts of the fourth embodiment will be given the same reference numerals as the parts of the fourth embodiment. Moreover, the descriptions of the parts of the fifth embodiment that are identical to the parts of the fourth embodiment may be omitted for the sake of brevity. The parts of the fifth embodiment that differ from the parts of the fourth embodiment will be indicated with a single prime ('), The motor/generator 41 of the fifth embodiment differs from the motor/generators of the first through fourth embodiments described above in that the motor/generator 41 of the fifth embodiment combines an axial gap structure and a radial gap structure together. More specifically, as shown FIG. 5, in the motor/generator 41, a radial gap type motor/generator portion for generating torque is formed by the stator 3' and a pair of first and second drive rotors 44A and 44B (first rotor member) that are arranged coaxially about the rotary shaft 2. On the other hand, an axial gap type motor/generator portion is formed by an auxiliary rotor 44C (second rotor member) (only one auxiliary rotor 44C is provided in the fifth embodiment). The auxiliary rotor 44C includes a base part 42 and a circumferential end portion. The circumferential end portion of the auxiliary rotor 44C extends between adjacent pair of the stator units 13' as shown in FIG. 5. The permanent magnets 21C' are disposed in the circumferential end portion of the auxiliary rotor 44C so that the permanent magnets 21C' and the stator 3' form the second magnetic circuit m2 with the second magnetic field when the coils 12' are energized with the second current component of the composite electric current.

The screw sections 23A' and 23B' are provided between the base part 42 of the auxiliary rotor 44C and the first and second drive rotors 44A and 44B. Similarly to the fourth embodiment, the screw sections 23A' and 23B' are configured and arranged to move the first and second drive rotors 44A and 44B in the axial direction with respect to the auxiliary rotors 44C by driving the auxiliary rotor 44C (the base part 42) with the second current component of the composite electrical current (the second magnetic circuit m2). Thus, the auxiliary rotor 44C serves as an actuator that moves the first and second drive rotors 44A and 44B in the axial direction. In the fifth embodiment illustrated in FIG. 5, the auxiliary rotor 44C and the screw sections 23A' and 23B' correspond to a magnetic resistance changing mechanism of the present invention.

Accordingly, the motor/generator 41 of the fifth embodiment shown in FIG. 5 can achieve the same operational effects as the first through fourth embodiments shown in FIGS. 1 through 4.

Sixth Embodiment

Figure 6:
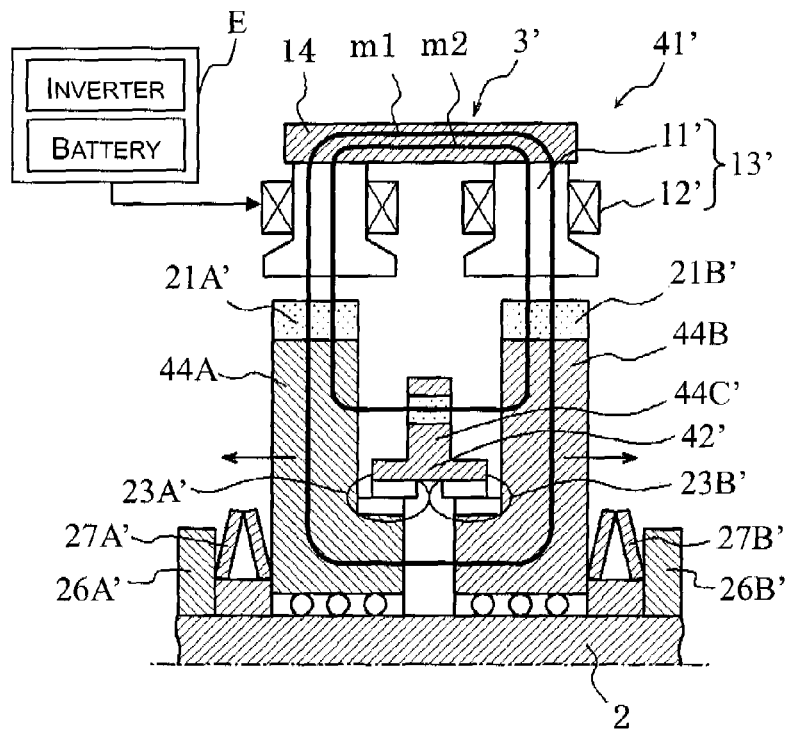
FIG. 6 is a simplified cross sectional view of a motor/generator taken along a center axis of a rotary shaft of the motor/generator in accordance with a sixth embodiment of the present invention.

Referring now to FIG. 6, a motor/generator 41' in accordance with a sixth embodiment will now be explained. In view of the similarity between the fifth and sixth embodiments, the parts of the sixth embodiment that are identical to the parts of the fifth embodiment will be given the same reference numerals as the parts of the fifth embodiment.

Moreover, the descriptions of the parts of the sixth embodiment that are identical to the parts of the fifth embodiment may be omitted for the sake of brevity. The parts of the sixth embodiment that differ from the parts of the fifth embodiment will be indicated with a single prime (').

The motor/generator 41' of the sixth embodiment is basically identical to the motor/generator 41 of the first embodiment except that the radial length of an auxiliary rotor 44C' (second rotor member) is changed such that the circumferential end portion of the auxiliary rotor 44C' does not extend between the stator units 13'. Similarly to the fifth embodiment, the auxiliary rotor 44C' of the sixth embodiment forms an axial gap type motor/generator portion that serves as an actuator configured and arranged to move the first and second drive rotors 44A and 44B in the axial direction with respect to the auxiliary rotors 44C by driving the auxiliary rotor 44C' (a base part 42') with the second current component of the composite electrical current (the second magnetic circuit m2). In the sixth embodiment illustrated in FIG. 6, the auxiliary rotor 44C' and the screw sections 23A' and 23B' correspond to a magnetic resistance changing mechanism of the present invention.

Accordingly, the motor/generator 41' of the sixth embodiment shown in FIG. 6 can achieve the same operational effects as the first through fifth embodiments shown in FIGS. 1 through 6.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A motor/generator comprising:
a stator having a plurality of coils configured and arranged to be energized with a composite electrical current to form first and second magnetic fields;
a first rotor member configured and arranged to be rotated with respect to the stator using the first magnetic field, the first rotor member having a first half and a second half, with the stator being disposed between the first and second halves along a rotary shaft of the first rotor member; and
a magnetic resistance changing mechanism configured and arranged to change a magnetic resistance between the stator and the first rotor member using the second magnetic field such that the first and second halves of the first rotor member move in opposite axial directions along the rotary shaft with respect to the stator.

2. The motor/generator recited in claim 1, wherein
the first rotor member is disposed to face the stator with axial gaps being formed between the first and second halves of the first rotor member and the stator with respect to the rotary shaft of the first rotor member, and
the magnetic resistance changing mechanism is configured and arranged to change a length of the axial gaps between the first and second halves of the first rotor member and the stator by using the second magnetic field to generate an axial force to move the first and second halves of the first rotor member in the opposite axial directions.

3. The motor/generator recited in claim 2, wherein
the magnetic resistance changing mechanism includes
a second rotor member disposed to face the stator with a radial gap being formed between the second rotor member and the stator with respect to the rotary shaft, the second rotor member being configured and arranged to be driven by using the second magnetic field, and
a power converting mechanism configured and arranged to convert torque of the second rotor member into the axial force to move the first and second halves of the first rotor member in the opposite axial directions.

4. A motor/generator comprising:
a stator having a plurality of coils configured and arranged to be energized with a composite electrical current to form first and second magnetic fields;
a first rotor member configured and arranged to be rotated with respect to the stator using the first magnetic field, the first rotor member being disposed to face the stator with an axial gap being formed between the first rotor member and the stator with respect to a rotary shaft of the first rotor member; and
a magnetic resistance changing mechanism configured and arranged to change a magnetic resistance between the stator and the first rotor member using the second magnetic field, the magnetic resistance changing mechanism being configured and arranged to change a length of the axial gap between the first rotor member and the stator by using the second magnetic field to generate an axial force to move the first rotor member in an axial direction, the magnetic resistance changing mechanism including
- a second rotor member disposed to face the stator with a radial gap being formed between the second rotor member and the stator with respect to the rotary shaft, the second rotor member being configured and arranged to be driven by using the second magnetic field, and
- a power converting mechanism configured and arranged to convert torque of the second rotor member into the axial force to move the first rotor member in the axial direction, the power converting mechanism including a screw section formed between the second rotor member and the rotary shaft.

5. The motor/generator recited in claim 3, wherein
the power converting mechanism includes a loading cam mechanism formed between the first rotor member and the second rotor member.

6. The motor/generator recited in claim 1, wherein
the first rotor member is disposed to face the stator with a radial gap being formed between the first rotor member and the stator such that the first rotor member and the stator at least partially overlap as viewed in a radial direction with respect to the rotary shaft of the first rotor member, and
the magnetic resistance changing mechanism is configured and arranged to change a circumferential area of the first rotor member that overlaps with the stator as viewed in the radial direction by using the second magnetic field to generate an axial force to move the first and second halves of the first rotor member in the opposite axial directions.

7. The motor/generator recited in claim 6, wherein
the magnetic resistance changing mechanism includes
- a second rotor member disposed to face the stator with a radial gap being formed between the second rotor member and the stator with respect to the rotary shaft, the second rotor member being configured and arranged to be driven by using the second magnetic field, and
- a power converting mechanism configured and arranged to convert torque of the second rotor member into the axial force to move the first and second halves of the first rotor member in the opposite axial directions.

8. The motor/generator recited in claim 7, wherein
the power converting mechanism includes a screw section.

9. The motor/generator recited in claim 8, wherein
the screw section is formed between the first rotor member and the second rotor member.

10. The motor/generator recited in claim 7, wherein
the power converting mechanism includes a loading cam mechanism formed between the first rotor member and the second rotor member.

11. The motor/generator recited in claim 6, wherein
the magnetic resistance changing mechanism includes
- a second rotor member disposed to face the stator with an axial gap being formed between the second rotor member and the stator with respect to the rotary shaft, the second rotor member being configured and arranged to be driven by using the second magnetic field, and
- a power converting mechanism configured and arranged to convert torque of the second rotor member into the axial force to move the first and second halves of the first rotor member in the opposite axial directions.

12. A motor/generator comprising:
magnetic field generating means for generating first and second magnetic fields when energized with a composite electrical current;
drive force outputting means for generating and outputting a rotary drive force using a first magnetic circuit formed by the first magnetic field, the drive force outputting means having a first half and a second half with the magnetic field generating means being disposed between the first and second halves along a rotary shaft of the drive force outputting means; and
magnetic resistance changing means for changing a magnetic resistance of the first magnetic circuit by using the second magnetic field such that the first and second halves of the drive force outputting means move in opposite axial directions along the rotary shaft with respect to the magnetic field generating means.

13. The motor/generator recited in claim 4, wherein
the stator has a stator core with the coils wound around the stator core, and
the second rotor member is positioned radially inward toward the rotary shaft such that the second rotor member does not face the stator core in the axial direction.

* * * * *

UNITED STATES PATENT AND TRADEMARK OFFICE
CERTIFICATE OF CORRECTION

PATENT NO. : 7,750,527 B2  Page 1 of 1
APPLICATION NO. : 11/684780
DATED : July 6, 2010
INVENTOR(S) : Yuichi Shibukawa It is certified that error appears in the above-identified patent and that said Letters Patent is hereby corrected as shown below:

Title page, change the listing of [30] from

"[30]   Foreign Application Priority Data
        Mar. 16, 2006 (JP) ................................. 2006-072558"

to

-- [30]  Foreign Application Priority Data
         Mar. 16, 2006 (JP) ................................. 2006-072558
         Feb. 19, 2007 (JP) ................................. 2007-038077 --

Signed and Sealed this

Twenty-eighth Day of September, 2010

David J. Kappos
*Director of the United States Patent and Trademark Office*